(12) United States Patent
Ochiai et al.

(10) Patent No.: US 9,926,831 B1
(45) Date of Patent: Mar. 27, 2018

(54) OUTBOARD MOTOR UNIT AND MARINE VESSEL

(71) Applicant: YAMAHA HATSUDOKI KABUSHIKI KAISHA, Iwata-shi, Shizuoka (JP)

(72) Inventors: Katsumi Ochiai, Shizuoka (JP); Toshio Suzuki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/686,279

(22) Filed: Aug. 25, 2017

(30) Foreign Application Priority Data

Sep. 23, 2016 (JP) ................... 2016-185975

(51) Int. Cl.
*F01P 3/20* (2006.01)

(52) U.S. Cl.
CPC ........... *F01P 3/202* (2013.01); *F01P 2050/02* (2013.01); *F01P 2060/02* (2013.01); *F01P 2060/12* (2013.01)

(58) Field of Classification Search
CPC .... F01P 3/202; F01P 2050/02; F01P 2060/02; F01P 2060/12
See application file for complete search history.

(56) References Cited

U.S. PATENT DOCUMENTS

| 4,741,162 | A | 5/1988 | Torigai | |
|---|---|---|---|---|
| 4,827,722 | A | 5/1989 | Torigai | |
| 5,239,950 | A | 8/1993 | Takahashi | |
| 5,293,846 | A | 3/1994 | Takahashi | |
| 7,021,262 | B1 * | 4/2006 | Belter | F02M 35/10013 123/184.42 |
| 7,100,584 | B1 * | 9/2006 | Bruestle | F02B 29/0418 123/563 |
| 8,833,073 | B2 * | 9/2014 | Kuhlbach | F01P 7/165 123/41.1 |
| 8,858,282 | B2 * | 10/2014 | Lonnborg | F02M 35/16 440/77 |
| 9,435,250 | B2 * | 9/2016 | Choi | F02B 29/0437 |
| 9,545,985 | B1 * | 1/2017 | Provost | B63H 20/28 |
| 2003/0013361 | A1 | 1/2003 | Gokan | |
| 2003/0019483 | A1 | 1/2003 | Gokan et al. | |
| 2005/0204730 | A1 | 9/2005 | Tsukahara et al. | |
| 2007/0079796 | A1 | 4/2007 | Mineo | |
| 2007/0107424 | A1 * | 5/2007 | Wizgall | F01P 3/202 60/597 |
| 2011/0253076 | A1 * | 10/2011 | Mikame | F01P 3/202 123/41.31 |

FOREIGN PATENT DOCUMENTS

EP      0 380 883 A1   8/1990
JP      2011-226390 A  11/2011

* cited by examiner

*Primary Examiner* — S. Joseph Morano
*Assistant Examiner* — Jovon Hayes
(74) *Attorney, Agent, or Firm* — Keating and Bennett, LLP

(57) ABSTRACT

An outboard motor unit includes an outboard motor including a cowling and an engine housed in the cowling and that is mounted on a vessel body, a supercharger that compresses air, and a compressed air cooler that is installed outside the cowling of the outboard motor and cools air compressed by the supercharger.

20 Claims, 3 Drawing Sheets

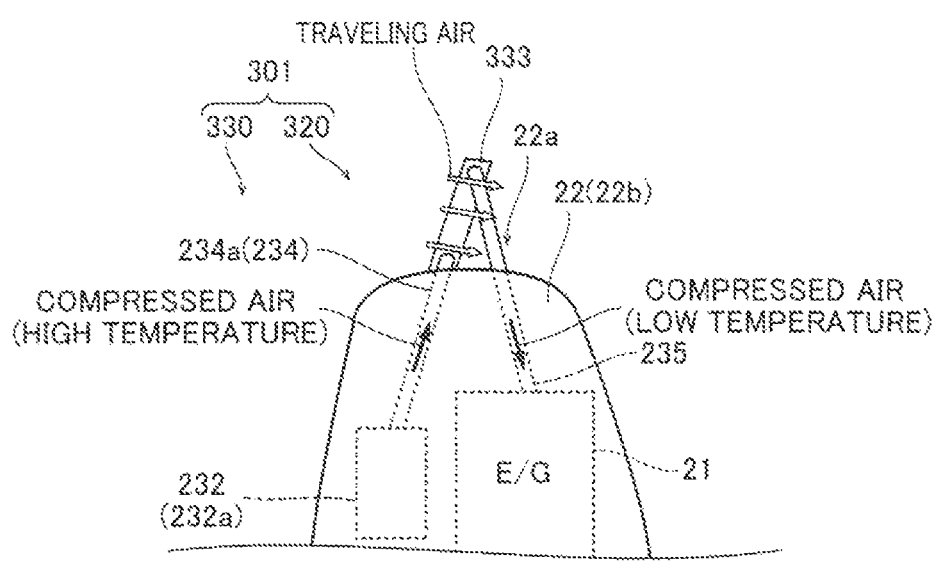

OUTBOARD MOTOR UNIT AND MARINE VESSEL

CROSS REFERENCE TO RELATED APPLICATIONS

This application claims the benefit of priority to Japanese Patent Application No. 2016-185975 filed on Sep. 23, 2016. The entire contents of this application are hereby incorporated herein by reference.

BACKGROUND OF THE INVENTION

1. Field of the Invention

The present invention relates to an outboard motor unit and a marine vessel including the outboard motor unit.

2. Description of the Related Art

An outboard motor including a supercharger is known in general. Such an outboard motor is disclosed in Japanese Patent Laid-Open No. 2011-226390, for example.

Japanese Patent Laid-Open No. 2011-226390 discloses an outboard motor including a cowling that includes an engine cover or the like. The outboard motor further includes an engine, an intercooler, and a turbocharger (supercharger), all of which are installed in the cowling.

In the outboard motor described in Japanese Patent Laid-Open No. 2011-226390, although the intercooler can be used to cool air (intake air) compressed by the turbocharger, the intercooler is disposed in the cowling, and hence the cowling is disadvantageously increased in size. In order to further improve engine performance, it is necessary to further lower the intake air temperature to increase the density of the compressed air (intake air) to be supplied to the engine. However, in order to further cool the compressed air, it is necessary to further increase the size of the intercooler, and hence it becomes more difficult to dispose the intercooler inside the cowling.

SUMMARY OF THE INVENTION

Preferred embodiments of the present invention provide an outboard motor unit that sufficiently cools air compressed by a supercharger while significantly reducing or preventing an increase in the size of a cowling of an outboard motor, and a marine vessel including the outboard motor unit.

An outboard motor unit according to a preferred embodiment of the present invention includes an outboard motor that includes a cowling and an engine housed in the cowling and is mounted on a vessel body, a supercharger that compresses air, and a compressed air cooler that is installed outside the cowling of the outboard motor and cools air compressed by the supercharger.

In an outboard motor unit according to a preferred embodiment of the present invention, the compressed air cooler is installed outside the cowling of the outboard motor such that an increase in the size of the cowling of the outboard motor is significantly reduced or prevented since the compressed air cooler is not installed inside the cowling. Furthermore, the air compressed by the supercharger is sufficiently cooled by the compressed air cooler, and hence the air compressed and cooled by the supercharger and the compressed air cooler is supplied to the engine of the outboard motor. Thus, the density of the air to be supplied to the engine of the outboard motor is increased, and hence the drive force (engine performance) of the engine is increased. Furthermore, the compressed air cooler is installed outside the cowling of the outboard motor such that, unlike the case where the compressed air cooler is disposed inside the cowling, the compressed air cooler is freely increased in size. Thus, the temperature of intake air is further lowered by the large-sized compressed air cooler, and hence the engine performance is further increased by further increasing the density of the compressed air (intake air) to be supplied to the engine.

In an outboard motor unit according to a preferred embodiment of the present invention, the compressed air cooler is preferably installed in the vessel body and outside the cowling or on an outer surface of the cowling. Accordingly, when the compressed air cooler is installed in the vessel body and outside the cowling, the compressed air cooler is securely fixed. When the compressed air cooler is installed on the outer surface of the cowling, the compressed air cooler is not installed in the vessel body such that a space occupied by the outboard motor unit in the vessel body is reduced.

An outboard motor unit according to a preferred embodiment of the present invention preferably further includes a cooled air passage that connects the compressed air cooler to the engine. Accordingly, the compressed and cooled air is reliably supplied from the compressed air cooler to the engine through the cooled air passage.

In an outboard motor unit according to a preferred embodiment of the present invention, the supercharger is preferably installed in the vessel body and outside the cowling. Accordingly, not only the compressed air cooler but also the supercharger is installed outside the cowling, and hence an increase in the size of the cowling of the outboard motor is further reduced or prevented. Furthermore, the supercharger is installed in the vessel body such that the supercharger is securely fixed.

In this case, the supercharger preferably includes a compressor installed in the vessel body and outside the cowling and that compresses the air and a drive installed in the vessel body and outside the cowling, is provided separately from the engine of the outboard motor, and supplies a drive force to the compressor. Accordingly, the compressor is driven by the drive force from the drive even when a drive force is not transmitted from the engine of the outboard motor. Consequently, the supercharger compresses the air without being influenced by the driving state of the engine of the outboard motor.

In a structure including the drive, the drive preferably includes an electric motor. Accordingly, the drive is easily located in the supercharger. Furthermore, the drive is electrically driven such that, as compared with the case in which the drive is engine-driven, a power required to drive the compressor is easily and quickly obtained. In other words, the responsiveness of the drive is improved.

In a structure including the drive, the drive may include an engine. Accordingly, the drive is easily located in the supercharger. Furthermore, the drive is an engine (internal combustion engine) such that a drive force supplied to the compressor is easily increased.

In a structure in which the supercharger is installed in the vessel body, an outboard motor unit according to a preferred embodiment of the present invention preferably further includes a cooled air passage that connects the compressed air cooler to the engine, a supercharger passage through which the air compressed by the supercharger is supplied to the compressed air cooler, a bypass passage that connects the supercharger passage upstream of the supercharger to the cooled air passage downstream of the supercharger, and a regulator valve located in the bypass passage and that regulates a flow of air that flows through the bypass passage, and the supercharger passage, the bypass passage, and the regulator valve are preferably installed in the vessel body and outside the cowling. Accordingly, the supercharger passage, the bypass passage, and the regulator valve are not installed inside the cowling, and hence an increase in the size of the cowling of the outboard motor is further reduced or prevented. In addition, the bypass passage and the regulator valve are installed such that the regulator valve is able to open to allow excessively compressed air to escape through the bypass passage. Consequently, the supply of excessively compressed air to the engine is significantly reduced or prevented.

In this case, an outboard motor unit according to a preferred embodiment of the present invention preferably further includes a throttle body installed in the vessel body and outside the cowling and located in the supercharger passage upstream of an upstream position at which the supercharger passage and the bypass passage are connected to each other. Accordingly, the throttle body is not installed inside the cowling, and hence an increase in the size of the cowling of the outboard motor is further reduced or prevented. Furthermore, the amount of air (intake air) to be supplied to the supercharger is adjusted by the throttle body.

In an outboard motor unit according to a preferred embodiment of the present invention, the compressed air cooler is preferably installed outside the cowling of the outboard motor and the supercharger is preferably installed inside the cowling of the outboard motor. Accordingly, the compressed air cooler is installed outside the cowling such that an increase in the size of the cowling of the outboard motor is significantly reduced or prevented, and the supercharger is installed inside the cowling such that in the outboard motor unit, the drive force of the engine of the outboard motor is easily supplied to the supercharger.

In this case, an outboard motor unit according to a preferred embodiment of the present invention preferably further includes a cooled air passage that connects the compressed air cooler to the engine, a supercharger passage through which the air compressed by the supercharger is supplied to the compressed air cooler, a bypass passage that connects the supercharger passage upstream of the supercharger to the cooled air passage downstream of the supercharger, and a regulator valve located in the bypass passage and that regulates a flow of air that flows through the bypass passage, and the bypass passage and the regulator valve are preferably installed inside the cowling of the outboard motor. Accordingly, the bypass passage and the regulator valve are easily located in the vicinity of the supercharger installed inside the cowling, and hence an increase in the length of the bypass passage is significantly reduced or prevented.

In an outboard motor unit according to a preferred embodiment of the present invention, the compressed air cooler is preferably air-cooled to cool the compressed air using air traveling by or past the vessel body. Accordingly, the compressed air cooler installed outside the cowling is efficiently cooled by the air traveling by the vessel body. Furthermore, unlike the case where the compressed air cooler is water-cooled to cool the compressed air using water, it is not necessary to install a pump to supply water to the compressed air cooler, a water passage through which water flows, and a water introduction container as a component that allows water to flow into the compressed air cooler, etc., and hence an increase in the number of components in the outboard motor unit is further reduced or prevented while an increase in the size of the outboard motor unit is significantly reduced or prevented.

In this case, the compressed air cooler is preferably mounted on an outer surface at a top of the cowling, for example. Accordingly, the air-cooled compressed air cooler is mounted on the top of the cowling through which the air traveling by the vessel body sufficiently flows such that the compressed air cooler efficiently cools the air compressed by the supercharger.

A marine vessel according to a preferred embodiment of the present invention includes a vessel body and an outboard motor unit including an outboard motor that includes a cowling and an engine housed in the cowling and is mounted on the vessel body, a supercharger that compresses air, and a compressed air cooler that is installed outside the cowling of the outboard motor and cools air compressed by the supercharger.

In a marine vessel according to a preferred embodiment of the present invention, the compressed air cooler of the outboard motor unit is installed outside the cowling of the outboard motor such that, similarly to the outboard motor unit according to the preferred embodiments of the present invention as described above, an increase in the size of the cowling of the outboard motor is significantly reduced or prevented, and the air compressed by the supercharger is sufficiently cooled.

In a marine vessel according to a preferred embodiment of the present invention, the compressed air cooler is preferably installed in the vessel body and outside the cowling or on an outer surface of the cowling. Accordingly, when the compressed air cooler is installed in the vessel body and outside the cowling, the compressed air cooler is securely fixed. When the compressed air cooler is installed on the outer surface of the cowling, the compressed air cooler is not installed in the vessel body such that a space occupied by the outboard motor unit in the vessel body is reduced.

In a marine vessel according to a preferred embodiment of the present invention, the outboard motor unit preferably further includes a cooled air passage that connects the compressed air cooler to the engine. Accordingly, the compressed and cooled air is reliably supplied from the compressed air cooler to the engine through the cooled air passage.

In a marine vessel according to a preferred embodiment of the present invention, the supercharger is preferably installed in the vessel body and outside the cowling. Accordingly, an increase in the size of the cowling of the outboard motor is further reduced or prevented, and the supercharger is securely fixed.

In this case, the supercharger preferably includes a compressor that is installed in the vessel body and outside the cowling and compresses the air and a drive that is installed in the vessel body and outside the cowling, is provided separately from the engine of the outboard motor, and supplies a drive force to the compressor. Accordingly, the supercharger compresses the air without being influenced by the driving state of the engine of the outboard motor.

In a marine vessel according to a preferred embodiment of the present invention, the compressed air cooler is preferably installed outside the cowling of the outboard motor and the supercharger is preferably installed inside the cowling of the outboard motor. Accordingly, the compressed air cooler is installed outside the cowling such that an increase in the size of the cowling of the outboard motor is further reduced or prevented, and the supercharger is installed inside the cowling such that in the outboard motor unit, the drive force of the engine of the outboard motor is easily supplied to the supercharger.

In a marine vessel according to a preferred embodiment of the present invention, the compressed air cooler is preferably air-cooled to cool the compressed air using air traveling by the vessel body. Accordingly, the compressed air cooler installed outside the cowling is efficiently cooled by the air traveling by the vessel body. Furthermore, unlike the case where the compressed air cooler is water-cooled to cool the compressed air using water, an increase in the number of components in the outboard motor unit is significantly reduced or prevented while an increase in the size of the outboard motor unit is further reduced or prevented.

The above and other elements, features, steps, characteristics and advantages of preferred embodiments of the present invention will become more apparent from the following detailed description of the preferred embodiments with reference to the attached drawings.

BRIEF DESCRIPTION OF THE DRAWINGS

FIG. 5 is a diagram schematically showing a portion of an outboard motor unit according to a modified second preferred embodiment of the present invention.

DETAILED DESCRIPTION OF THE PREFERRED EMBODIMENTS

Preferred embodiments of the present invention are hereinafter described with reference to the drawings.

First Preferred Embodiment

The structure of a marine vessel 100 according to a first preferred embodiment of the present invention is described with reference to FIGS. 1 and 2. In the figures, arrow FWD represents the forward movement direction (front) of the marine vessel 100, and arrow BWD represents the backward movement direction (rear) of the marine vessel 100.

Figure 1:
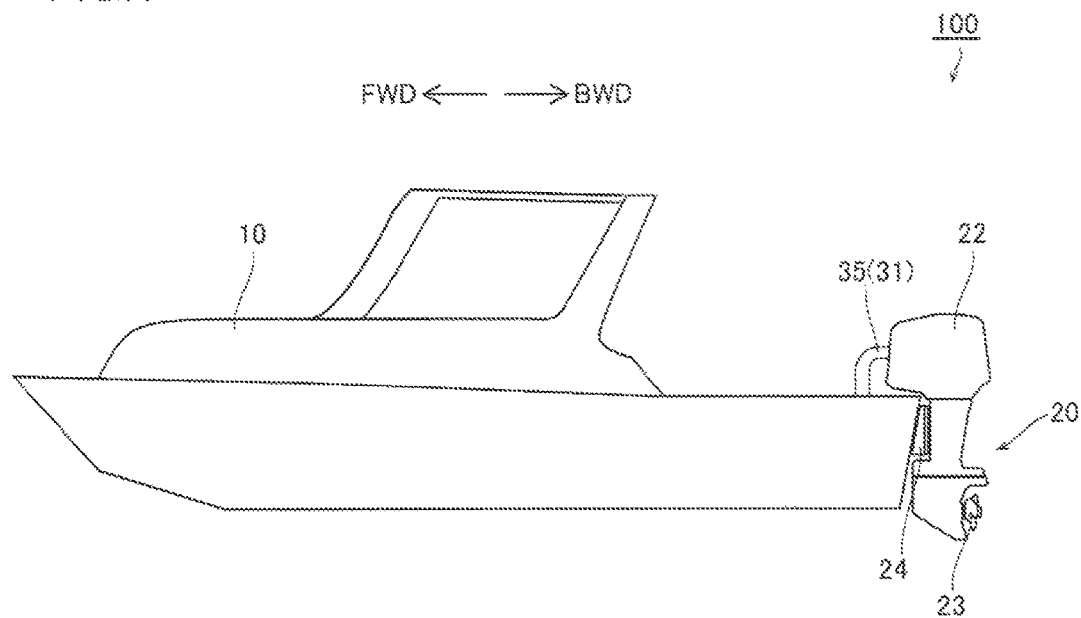
FIG. 1 is a diagram schematically showing a marine vessel including an outboard motor unit according to a first preferred embodiment of the present invention.
Figure 2:
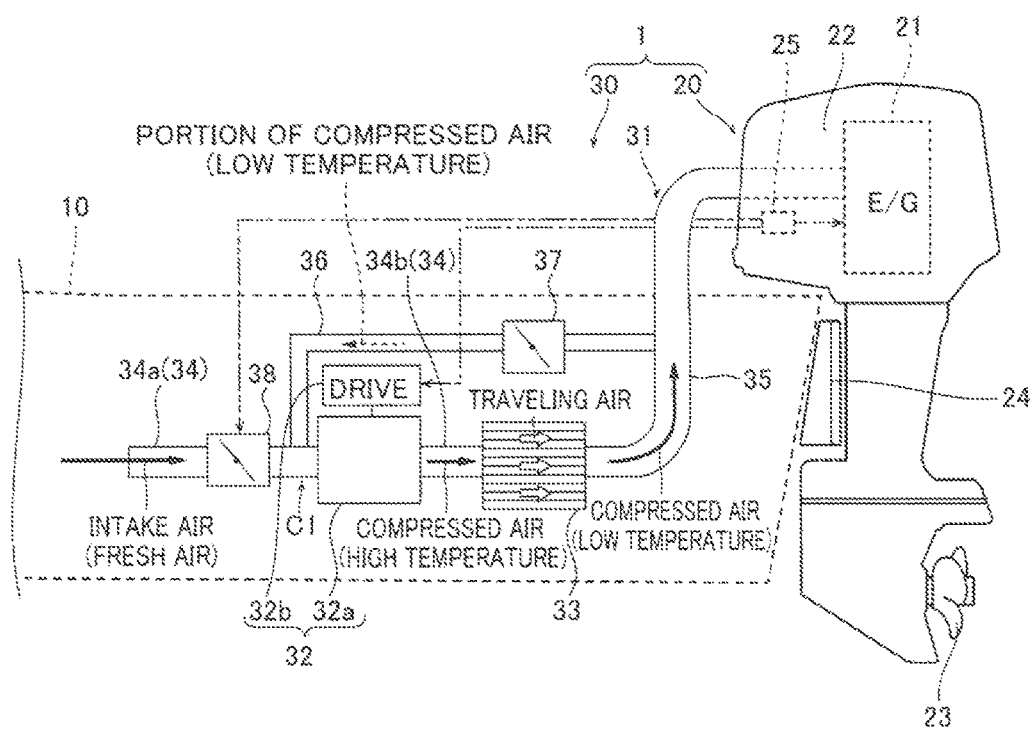
FIG. 2 is a diagram schematically showing the outboard motor unit according to the first preferred embodiment of the present invention.

The marine vessel 100 according to the first preferred embodiment includes a vessel body 10 and an outboard motor 20 mounted on the vessel body 10, in which an engine 21 is mounted, as shown in FIG. 1.

In the marine vessel 100, the vessel body 10 is steered based on an operation of a steering wheel (not shown) performed by an operator. In the marine vessel 100, the output and shifting (forward movement, backward movement, or neutral) of the engine 21 of the outboard motor 20 are controlled based on an operation of a remote controller (not shown) performed by the operator.

As shown in FIG. 1, the outboard motor 20 is mounted on a rear end (an end in the backward movement direction) of the vessel body 10. As shown in FIG. 2, the outboard motor 20 includes the engine (E/G) 21, a cowling 22 in which the engine 21 is housed, and a propeller 23 exposed rearward from the cowling 22 and rotationally driven by the engine 21. The outboard motor 20 is mounted on the vessel body 10 through a bracket 24.

The outboard motor 20 includes an ECU (engine control unit) 25 that is installed inside the cowling 22 and controls the output (rotational speed) of the engine 21.

The marine vessel 100 includes a supercharging unit 30 that supplies new air (fresh air) introduced from an intake duct (not shown) as compressed air to the engine 21 of the outboard motor 20. An outboard motor unit 1 includes the outboard motor 20 and the supercharging unit 30.

The supercharging unit 30 includes an intake air passage 31 through which air (intake air) flows, a supercharger 32 that compresses the air, and an intercooler 33 that cools the compressed air. The intercooler 33 is an example of a "compressed air cooler".

The intake air passage 31 includes a supercharger passage 34 that extends from the intake duct (not shown) to the intercooler 33, and a cooled air passage 35 that connects the intercooler 33 to the engine 21 of the outboard motor 20. The supercharger passage 34 includes a first supercharger passage 34a that connects the intake duct to the supercharger 32 and a second supercharger passage 34b that connects the supercharger 32 to the intercooler 33. The air flows through the first supercharger passage 34a, the second supercharger passage 34b, and the cooled air passage 35 in this order to be supplied to the engine 21 of the outboard motor 20. The cooled air passage 35 is an example of an "air passage".

The intake air passage 31 includes a bypass passage 36 that connects the first supercharger passage 34a to the cooled air passage 35. The supercharging unit 30 includes a regulator valve 37 located in the bypass passage 36. Thus, in the supercharging unit 30, the regulator valve 37 is opened when the pressure of the compressed and cooled air that flows through the cooled air passage 35 is equal to or higher than a predetermined pressure. Consequently, supply of the compressed and cooled air of the predetermined pressure or higher to the engine 21 of the outboard motor 20 is significantly reduced or prevented.

The supercharger passage 34, a portion of the cooled air passage 35 closer to the intercooler 33 (upstream side), and the bypass passage 36 of the intake air passage 31 are located in the vessel body 10 and outside the cowling 22 of the outboard motor 20.

A downstream portion of the cooled air passage 35 passes through the cowling 22 to be introduced into the cowling 22. The cooled air passage 35 is connected to an intake pipe (not shown) of the engine 21 of the outboard motor 20. The cooled air passage 35 connected to the outboard motor 20 includes a flexible pipe member that is deformable in response to its displacement, such as tilting of the outboard motor 20.

According to the first preferred embodiment, both the supercharger 32 and the intercooler 33 are installed in the vessel body 10 and outside the cowling 22 of the outboard motor 20. The supercharger 32 and the intercooler 33 are fixed at a predetermined position of the vessel body 10. This fixed position is preferably a rear portion of the vessel body 10 in the vicinity of the outboard motor 20.

The supercharger 32 includes a so-called mechanical compressor 32a that compresses air and a drive 32b that drives the compressor 32a. As a driving system of the compressor 32a, a centrifugal type, a roots type, a screw type, a rotary type, or the like, may be used, for example.

The drive 32b is provided separately from the engine 21, and supplies a drive force to the compressor 32a independently of the engine 21. The drive 32b is controlled by the ECU 25 in cooperation with a drive control of the engine 21 of the outboard motor 20. Thus, in the supercharger 32, the air is efficiently compressed to a desired pressure (a pressure according to a drive force generated by the engine 21). The drive 32b may be an electric motor or may be an engine provided separately from the engine 21. When the drive 32b is an electric motor, electric power may be supplied from a battery (not shown) located in the vessel body 10, or a battery that supplies electric power may be mounted on the drive 32b. When the drive 32b is an engine, an engine smaller than the engine 21 of the outboard motor 20 may be used.

The intercooler 33 cools the air compressed by the supercharger 32 using traveling air when the vessel body 10 travels due to driving the engine 21 of the outboard motor 20. Specifically, in the intercooler 33, the compressed air and the traveling air that flow through the intercooler 33 exchange heat with each other through a heat radiating member such as a fin such that the compressed air is cooled. That is, the intercooler 33 is air-cooled. Due to the intercooler 33, the temperature of the air to be supplied to the engine 21 of the outboard motor 20 is lowered, and the density of the air is increased. The intercooler 33 may perform cooling with air other than the traveling air so far as the same performs cooling with air.

Furthermore, the supercharger passage 34, an upstream portion of the cooled air passage 35, and the bypass passage 36 are located outside the cowling 22. Thus, as compared with the case where the passages are located inside the cowling 22 in which heat is likely to be trapped, the air to be supplied to the engine 21 is further cooled in the passages located outside the cowling 22.

A throttle body 38 is located in the supercharger passage 34 upstream of an upstream position C1 at which the first supercharger passage 34a of the supercharger passage 34 and the bypass passage 36 are connected to each other. That is, the throttle body 38 is installed in the vessel body 10 and outside the cowling 22 of the outboard motor 20. The throttle body 38 adjusts the amount of air (intake air) to be supplied to the supercharger 32 (compressor 32a). The ECU 25 controls the throttle body 38 to adjust the amount of air.

The intake air supplied to the engine 21 of the outboard motor 20 in the marine vessel 100 is now described with reference to FIG. 2.

As to the air (intake air, fresh air) introduced from the intake duct (not shown) into the first supercharger passage 34a of the intake air passage 31, the throttle body 38 controlled by the ECU 25 adjusts the amount of air to be supplied to the supercharger 32. Then, in the supercharger 32 controlled by the ECU 25, the air is compressed. At this time, heat is generated in the air due to the compression of the air such that the temperature of the compressed air becomes high.

Thereafter, the high-temperature compressed air is supplied to the intercooler 33 through the second supercharger passage 34b. When the high-temperature compressed air flows through the intercooler 33, the high-temperature compressed air is cooled by the air traveling by the vessel body 10 to become low-temperature compressed air. The low-temperature compressed air is introduced into the cowling 22 from the outside of the cowling 22 of the outboard motor 20 through the cooled air passage 35. Finally, the low-temperature compressed air is supplied to the engine 21 housed in the cowling 22.

When the regulator valve 37 is in a partially or fully open state, the low-temperature compressed air is partially returned to the first supercharger passage 34a downstream of the throttle body 38 through the bypass passage 36. Thus, the low-temperature compressed air is recompressed together with fresh air by the supercharger 32.

According to the first preferred embodiment of the present invention, the following advantageous effects are obtained.

According to the first preferred embodiment of the present invention, the intercooler 33 is installed outside the cowling 22 of the outboard motor 20 such that an increase in the size of the cowling 22 of the outboard motor 20 is significantly reduced or prevented since the intercooler 33 is not installed inside the cowling 22. Furthermore, the air compressed by the supercharger 32 is sufficiently cooled by the intercooler 33, and hence the air compressed and cooled by the supercharger 32 and the intercooler 33 is supplied to the engine 21 of the outboard motor 20. Thus, the density of the air to be supplied to the engine 21 of the outboard motor 20 is increased, and hence the drive force (engine performance) of the engine 21 is increased.

According to the first preferred embodiment of the present invention, the intercooler 33 is installed outside the cowling 22 of the outboard motor 20 such that, unlike the case in which the intercooler 33 is disposed inside the cowling 22, the intercooler 33 is freely increased in size. Thus, the temperature of the intake air is further lowered by the large-sized intercooler 33, and hence the engine performance is further increased by further increasing the density of the compressed air (intake air) to be supplied to the engine 21.

According to the first preferred embodiment of the present invention, the intercooler 33 is installed in the vessel body 10 and outside the cowling 22 such that the intercooler 33 is securely fixed.

According to the first preferred embodiment of the present invention, the marine vessel 100 includes the cooled air passage 35 that connects the intercooler 33 to the engine 21. Thus, the compressed and cooled air (low-temperature compressed air) is reliably supplied from the intercooler 33 to the engine 21 through the cooled air passage 35.

According to the first preferred embodiment of the present invention, in addition to the intercooler 33, the supercharger 32 is installed in the vessel body 10 and outside the cowling 22. Thus, not only the intercooler 33 but also the supercharger 32 is installed outside the cowling 22, and hence an increase in the size of the cowling 22 of the outboard motor 20 is further reduced or prevented. Furthermore, the supercharger 32 is installed in the vessel body 10 such that the supercharger 32 is securely fixed.

According to the first preferred embodiment of the present invention, the supercharger 32 includes the compressor 32a installed in the vessel body 10 and outside the cowling 22 and that compresses the air, and the drive 32b that is installed in the vessel body 10 and outside the cowling 22, is provided separately from the engine 21 of the outboard motor 20, and supplies a drive force to the compressor 32a. Thus, the compressor 32a of the supercharger 32 is driven by the drive force from the drive 32b even when a drive force is not transmitted from the engine 21 of the outboard motor 20. Consequently, the supercharger 32 compresses the air without being influenced by the driving state of the engine 21 of the outboard motor 20.

According to the first preferred embodiment of the present invention, the drive 32b may include an electric motor such that the drive 32b is easily located in the supercharger 32, and the drive 32b is electrically driven such that, as compared with the case where the drive 32b is engine-driven, a power required to drive the compressor 32a of the supercharger 32 is easily and quickly obtained. In other words, the responsiveness of the drive 32b is improved.

According to the first preferred embodiment of the present invention, the drive 32b may include an engine such that the drive 32b is easily located in the supercharger 32, and the drive 32b is an engine (internal combustion engine) such that a drive force for the compressor 32a is easily increased.

According to the first preferred embodiment of the present invention, the supercharger passage 34, the bypass passage 36, and the regulator valve 37 are preferably installed in the vessel body 10 and outside the cowling 22. Thus, the supercharger passage 34, the bypass passage 36, and the regulator valve 37 are not installed inside the cowling 22, and hence an increase in the size of the cowling 22 of the outboard motor 20 is further reduced or prevented. In addition, the bypass passage 36 and the regulator valve 37 are installed such that the regulator valve 37 is opened to allow excessively compressed air to escape through the bypass passage 36. Consequently, supply of excessively compressed air to the engine 21 is significantly reduced or prevented.

According to the first preferred embodiment of the present invention, the throttle body 38 is located in the supercharger passage 34 upstream of the upstream position C1 at which the supercharger passage 34 and the bypass passage 36 are connected to each other in the vessel body 10 and outside the cowling 22. Thus, the throttle body 38 is not installed inside the cowling 22, and hence an increase in the size of the cowling 22 of the outboard motor 20 is further reduced or prevented. Furthermore, the amount of air (intake air) to be supplied to the supercharger 32 is adjusted by the throttle body 38.

According to the first preferred embodiment of the present invention, the intercooler 33 is air-cooled to cool the compressed air using the air traveling by the vessel body 10. Thus, the intercooler 33 installed outside the cowling 22 is efficiently cooled by the air traveling by the vessel body 10. Furthermore, the intercooler 33 is air-cooled such that unlike the case where the intercooler is water-cooled to cool the compressed air using water, it is not necessary to install a pump to supply water to the intercooler, a water passage through which water flows, and a water introduction container as a component that allows water to flow into the intercooler, etc. Thus, an increase in the number of components in the outboard motor unit 1 is further reduced or prevented while an increase in the size of the outboard motor unit 1 is significantly reduced or prevented.

Second Preferred Embodiment

The structure of a marine vessel 200 according to a second preferred embodiment of the present invention is now described with reference to FIGS. 3 and 4. In the second preferred embodiment, a supercharger 232 (compressor 232a) is installed inside a cowling 22 of an outboard motor 220 unlike the marine vessel 100 according to the first preferred embodiment in which the supercharger 32 is installed in the vessel body 10. In the second preferred embodiment, the same structures as those of the first preferred embodiment are denoted by the same reference numerals and description thereof is omitted.

Figure 3:
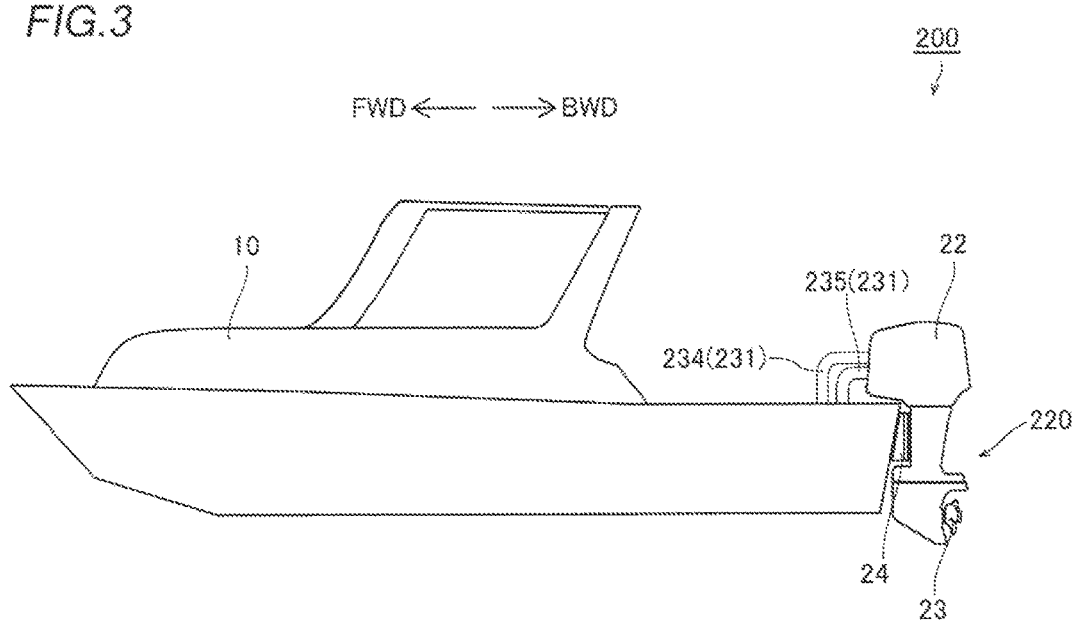
FIG. 3 is a diagram schematically showing a marine vessel including an outboard motor unit according to a second preferred embodiment of the present invention.
Figure 4:
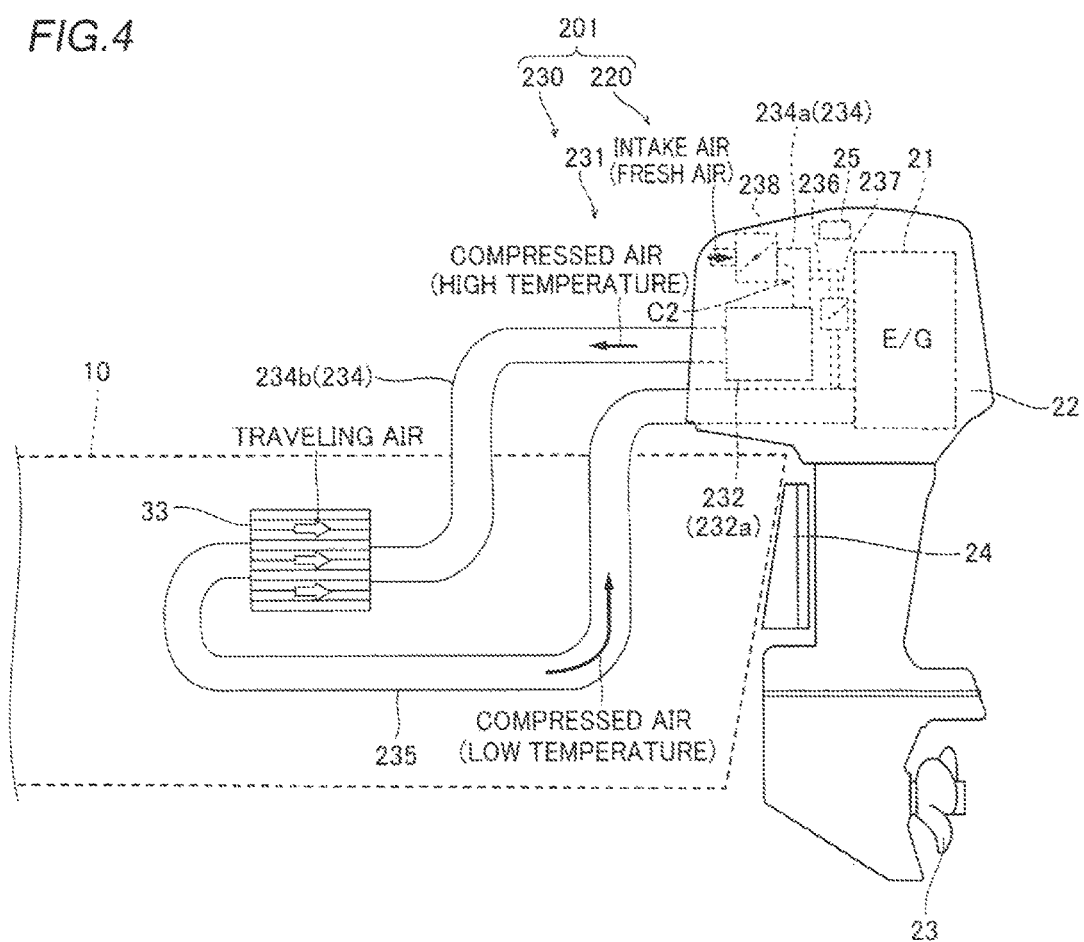
FIG. 4 is a diagram schematically showing the outboard motor unit according to the second preferred embodiment of the present invention.

As shown in FIGS. 3 and 4, the marine vessel 200 according to the second preferred embodiment includes a vessel body 10, the outboard motor 220 mounted on the vessel body 10, in which an engine 21 is mounted, and a supercharging unit 230. An outboard motor unit 201 includes the outboard motor 220 and the supercharging unit 230.

As shown in FIG. 4, the supercharging unit 230 includes an intake air passage 231, the supercharger 232 that compresses air (intake air), an intercooler 33 that cools the compressed air, and a regulator valve 237.

According to the second preferred embodiment, as a portion of the supercharging unit 230, a portion of the intake air passage 231, the supercharger 232, the regulator valve 237, and a throttle body 238 are installed inside the cowling 22 of the outboard motor 220. On the other hand, the intercooler 33 is installed in the vessel body 10 and outside the cowling 22 of the outboard motor 220, similarly to the first preferred embodiment.

Specifically, a first supercharger passage 234a, an upstream portion of a second supercharger passage 234b, a downstream portion of a cooled air passage 235, and a bypass passage 236 of the intake air passage 231 are installed inside the cowling 22 of the outboard motor 220. On the other hand, a downstream portion of the second supercharger passage 234b connected to an upstream portion of the intercooler 33, the intercooler 33, and an upstream portion of the cooled air passage 235 connected to a downstream portion of the intercooler 33 are installed in the vessel body 10 and outside the cowling 22 of the outboard motor 220. The cooled air passage 235 is an example of an "air passage".

The downstream portion of the second supercharger passage 234b and the upstream portion of the cooled air passage 235 are located outside the cowling 22 such that, as compared with the case in which the downstream portion of the second supercharger passage 234b and the upstream portion of the cooled air passage 235 are located inside the cowling 22 in which heat is likely to be trapped, the air to be supplied to the engine 21 is sufficiently cooled in the passages located outside the cowling 22.

The supercharger 232 includes a so-called mechanical compressor 232a that compresses air. A drive force is supplied from the engine 21 inside the cowling 22 to the supercharger 232. A clutch (not shown) is controlled by an ECU 25 such that a drive force in an adjusted state is transmitted from the engine 21 to the supercharger 232. The remaining structures of the second preferred embodiment are similar to those of the first preferred embodiment.

According to the second preferred embodiment of the present invention, the following advantageous effects are obtained.

According to the second preferred embodiment of the present invention, the intercooler 33 is installed outside the cowling 22 of the outboard motor 220 such that an increase in the size of the cowling 22 of the outboard motor 220 is significantly reduced or prevented, similarly to the first preferred embodiment.

According to the second preferred embodiment of the present invention, the intercooler 33 is installed outside the cowling 22 of the outboard motor 220 while the supercharger 232 is installed inside the cowling 22 of the outboard motor 220. Thus, the intercooler 33 is installed outside the cowling 22 such that an increase in the size of the cowling 22 of the outboard motor 220 is significantly reduced or prevented, and the supercharger 232 is installed inside the cowling 22 such that in the outboard motor unit 201, the drive force of the engine 21 of the outboard motor 220 is easily supplied to the supercharger 232.

According to the second preferred embodiment of the present invention, the bypass passage 236 and the regulator valve 237 are installed inside the cowling 22 of the outboard motor 220. Thus, the bypass passage 236 and the regulator valve 237 are easily located in the vicinity of the supercharger 232 installed inside the cowling 22, and hence an increase in the length of the bypass passage 236 is significantly reduced or prevented. The remaining advantageous effects of the second preferred embodiment are similar to those of the first preferred embodiment.

Modified Second Preferred Embodiment

A modified second preferred embodiment of the present invention is described with reference to FIG. 5. In the modified second preferred embodiment, an intercooler 333 is mounted on an outer surface 22b of a cowling 22 of an outboard motor 320 unlike the second preferred embodiment in which the intercooler 33 is installed in the vessel body 10. In the modified second preferred embodiment, the same structures as those of the second preferred embodiment are denoted by the same reference numerals and description thereof is omitted. The intercooler 333 is an example of a "compressed air cooler".

As shown in FIG. 5, the air-cooled intercooler 333 is installed as an element of a supercharging unit 330 in the outboard motor 320 of an outboard motor unit 301 according to the modified second preferred embodiment. Specifically, the air-cooled intercooler 333 is mounted on the outer surface 22b at a top 22a of the cowling 22 of the outboard motor 320, for example. Consequently, the intercooler 333 is installed outside the cowling 22 of the outboard motor 320. The remaining structures of the modified second preferred embodiment are similar to those of the second preferred embodiment.

According to the modified second preferred embodiment of the present invention, the following advantageous effects are obtained.

According to the modified second preferred embodiment of the present invention, the intercooler 333 is installed outside the cowling 22 of the outboard motor 320 such that an increase in the size of the cowling 22 of the outboard motor 320 is significantly reduced or prevented, similarly to the second preferred embodiment.

According to the modified second preferred embodiment of the present invention, the intercooler 333 is mounted on the outer surface 22b at the top 22a of the cowling 22 of the outboard motor 320, for example. Thus, the intercooler 333 is not installed in a vessel body 10 such that a space occupied by the outboard motor unit 301 in the vessel body 10 is reduced. Furthermore, the air-cooled intercooler 333 is mounted on the top 22a of the cowling 22 through which air traveling by the vessel body 10 sufficiently flows such that the intercooler 333 efficiently cools air compressed by a supercharger 232. The remaining advantageous effects of the modified second preferred embodiment are similar to those of the second preferred embodiment.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while one outboard motor is preferably installed in the marine vessel in each of the first and second preferred embodiments and the modified second preferred embodiment described above, the present invention is not restricted to this. A plurality of outboard motors may alternatively be installed in the marine vessel. That is, the outboard motor unit may include the plurality of outboard motors and one supercharging unit (one supercharger and one compressed air cooler). Furthermore, a plurality of outboard motor units may alternatively be installed in the marine vessel. That is, the plurality of outboard motor units each including one (or a plurality of) outboard motor(s) and one supercharging unit may be installed in the marine vessel.

While the mechanical supercharger 232 (compressor 232a) is preferably used as the "supercharger" installed inside the cowling 22 of the outboard motor 220 (320) in each of the second preferred embodiment and the modified second preferred embodiment described above, the present invention is not restricted to this. As the supercharger installed inside the cowling of the outboard motor, an exhaust gas turbine supercharger (so-called turbocharger) using exhaust gas of the engine housed in the cowling of the outboard motor as a drive source may alternatively be used.

While the air-cooled intercooler 33 (333) (compressed air cooler) is preferably used in each of the first and second preferred embodiments and the modified second preferred embodiment described above, the present invention is not restricted to this. The compressed air cooler may alternatively be other than air-cooled. For example, a water-cooled compressed air cooler using cooling water may be used.

While the intercooler 33 (compressed air cooler) is preferably installed in the vessel body 10 in each of the first and second preferred embodiments described above, and the intercooler 333 (compressed air cooler) is preferably mounted on the outer surface 22b at the top 22a of the cowling 22 of the outboard motor 320 in the modified second preferred embodiment described above, the present invention is not restricted to this. It is preferable that the compressed air cooler be installed outside the cowling of the outboard motor. For example, the compressed air cooler may be mounted on an outer side surface of the cowling of the outboard motor. Furthermore, so far as the compressed air cooler is installed outside the cowling of the outboard motor, the installation positions of the other members that the outboard motor unit includes, such as the supercharger and the throttle body, are not particularly restricted.

While both the supercharger 32 and the bypass passage 36 are preferably located in the vessel body 10 in the first preferred embodiment described above, and both the supercharger 232 and the bypass passage 236 are preferably located inside the cowling 22 of the outboard motor 220, the present invention is not restricted to this. One of the supercharger and the bypass passage may alternatively be located in the vessel body (outside the cowling), and the other of the supercharger and the bypass passage may alternatively be located inside the cowling.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An outboard motor unit comprising:
   an outboard motor including a cowling and an engine housed in the cowling and that is mounted on a vessel body;
   a supercharger that compresses air; and
   a compressed air cooler that is installed outside the cowling of the outboard motor and cools air compressed by the supercharger.

2. The outboard motor unit according to claim 1, wherein the compressed air cooler is installed in the vessel body and outside the cowling or on an outer surface of the cowling.

3. The outboard motor unit according to claim 1, further comprising a cooled air passage that connects the compressed air cooler to the engine.

4. The outboard motor unit according to claim 1, wherein the supercharger is installed in the vessel body and outside the cowling.

5. The outboard motor unit according to claim 4, wherein the supercharger includes a compressor installed in the vessel body and outside the cowling and that compresses the air, and a drive installed in the vessel body and outside the cowling, is provided separately from the engine of the outboard motor, and supplies a drive force to the compressor.

6. The outboard motor unit according to claim 5, wherein the drive includes an electric motor.

7. The outboard motor unit according to claim 5, wherein the drive includes an engine.

8. The outboard motor unit according to claim 4, further comprising:
a cooled air passage that connects the compressed air cooler to the engine;
a supercharger passage through which the air compressed by the supercharger is supplied to the compressed air cooler;
a bypass passage that connects the supercharger passage upstream of the supercharger to the cooled air passage downstream of the supercharger; and
a regulator valve located in the bypass passage and that regulates a flow of air that flows through the bypass passage; wherein
the supercharger passage, the bypass passage, and the regulator valve are installed in the vessel body and outside the cowling.

9. The outboard motor unit according to claim 8, further comprising a throttle body installed in the vessel body and outside the cowling and located in the supercharger passage upstream of a position at which the supercharger passage and the bypass passage are connected to each other.

10. The outboard motor unit according to claim 1, wherein the compressed air cooler is installed outside the cowling of the outboard motor and the supercharger is installed inside the cowling of the outboard motor.

11. The outboard motor unit according to claim 10, further comprising:
a cooled air passage that connects the compressed air cooler to the engine;
a supercharger passage through which the air compressed by the supercharger is supplied to the compressed air cooler;
a bypass passage that connects the supercharger passage upstream of the supercharger to the cooled air passage downstream of the supercharger; and
a regulator valve located in the bypass passage and that regulates a flow of air that flows through the bypass passage; wherein
the bypass passage and the regulator valve are installed inside the cowling of the outboard motor.

12. The outboard motor unit according to claim 1, wherein the compressed air cooler is air-cooled to cool the compressed air using air traveling past the vessel body.

13. The outboard motor unit according to claim 12, wherein the compressed air cooler is mounted on an outer surface at a top of the cowling.

14. A marine vessel comprising:
a vessel body; and
an outboard motor unit including:
an outboard motor that includes a cowling and an engine housed in the cowling and is mounted on the vessel body;
a supercharger that compresses air; and
a compressed air cooler installed outside the cowling of the outboard motor and that cools air compressed by the supercharger.

15. The marine vessel according to claim 14, wherein the compressed air cooler is installed in the vessel body and outside the cowling or on an outer surface of the cowling.

16. The marine vessel according to claim 14, wherein the outboard motor unit further includes a cooled air passage that connects the compressed air cooler to the engine.

17. The marine vessel according to claim 14, wherein the supercharger is installed in the vessel body and outside the cowling.

18. The marine vessel according to claim 17, wherein the supercharger includes a compressor installed in the vessel body and outside the cowling and that compresses the air, and a drive that is installed in the vessel body and outside the cowling, is provided separately from the engine of the outboard motor, and supplies a drive force to the compressor.

19. The marine vessel according to claim 14, wherein the compressed air cooler is installed outside the cowling of the outboard motor and the supercharger is installed inside the cowling of the outboard motor.

20. The marine vessel according to claim 14, wherein the compressed air cooler is air-cooled to cool the compressed air using air traveling past the vessel body.

* * * * *